United States Patent [19]

Koura et al.

[11] Patent Number: 5,473,021

[45] Date of Patent: * Dec. 5, 1995

[54] PROCESS FOR PRODUCING ETHYLENE-PROPYLENE BLOCK COPOLYMER

[75] Inventors: Hiroyuki Koura; Takeshi Ebara, both of Ichihara; Kazuki Wakamatsu, Sodegaura; Shozo Kawamata; Yoshizumi Sasaki, both of Ichihara, all of Japan

[73] Assignee: Sumitomo Chemical Company, Limited, Osaka, Japan

[ * ] Notice: The portion of the term of this patent subsequent to Sep. 12, 2012, has been disclaimed.

[21] Appl. No.: 176,917

[22] Filed: Jan. 3, 1994

[30] Foreign Application Priority Data

Jan. 4, 1993 [JP] Japan .................................. 5-000051

[51] Int. Cl.$^6$ ................................................. C08F 297/08
[52] U.S. Cl. ........................ 525/247; 525/254; 525/270; 525/323
[58] Field of Search .................................. 525/247, 254, 525/270, 323

[56] References Cited

U.S. PATENT DOCUMENTS

| | | | |
|---|---|---|---|
| 4,547,552 | 10/1985 | Toyota et al. | 525/247 |
| 4,822,840 | 4/1989 | Kioka et al. | 525/240 |
| 5,023,223 | 6/1991 | Ebara et al. | 502/116 |

FOREIGN PATENT DOCUMENTS

| | | |
|---|---|---|
| 0385765 | 9/1990 | European Pat. Off. . |
| 0522784 | 1/1993 | European Pat. Off. . |
| 61-215613 | 9/1986 | Japan . |

OTHER PUBLICATIONS

Derwent Accession No. 86–294544/45 (1986).

*Primary Examiner*—Romulo H. Delmendo

[57] ABSTRACT

A process for producing ethylene-propylene block copolymer which comprises
(1) The first step of reacting propylene or a mixture of propylene and ethylene in the presence of a catalyst composed essentially of
  (A) a solid catalyst component containing magnesium, titanium and a halogen as the indispensable ingredients,
  (B) an organoaluminum compound, and
  (C) a silicon compound (1) represented by the formula $R^1R^2Si(OR^3)_2$, wherein $R^1$ is an alicyclic hydrocarbon group of 5–20 carbon atoms and $R^2$ and $R^3$ are each independently a hydrocarbon group of 1–20 carbon atoms, to form a propylene homopolymer portion or an ethylene-propylene copolymer portion having an ethylene content of 3% by weight or less, in an amount corresponding to 50–95% by weight of the total block copolymer amount, and
(2) the second step of reacting a mixture of ethylene and propylene with the polymer portion obtained in the first step in the presence of the aforesaid catalyst composed essentially of the components (a), (b) and (c) and in the additional presence of a silicon compound (2) represented by the formula $R^4{}_a Si(OR^5)_{4-a}$, wherein $R^4$ and $R^5$ are each independently a hydrocarbon group of 1–20 carbon atoms and a is a number satisfying the equation $0 \leq a < 4$, to obtain an ethylene-propylene block copolymer which contains an ethylene-propylene copolymer portion having an ethylene content of at least 20% by weight, in an amount corresponding to 5–50% by weight of the total block copolymer amount.

20 Claims, No Drawings

PROCESS FOR PRODUCING ETHYLENE-PROPYLENE BLOCK COPOLYMER

BACKGROUND OF THE INVENTION

1. Field of the Invention

The present invention relates to a process for producing ethylene-propylene block copolymers.

2. Description of the Related Art

In polymerization of olefins such as ethylene, propylene, etc., the performance characteristics of the polymerization catalyst used therefor have markedly advanced and the yield of polymer per unit weight of catalyst component has drastically improved in recent years. As a consequence, the amount of the transition metal catalyst component remaining in the resulting polymer has been decreased and the elimination of catalyst residue removal step has become possible.

Processes in use for the polymerization of these olefins include the slurry polymerization process conducted in inert hydrocarbon solvents, the bulk polymerization process conducted in liquified monomers such as liquified propylene, and the gas phase polymerization process conducted in a gas phase.

For producing block copolymers of ethylene and propylene, there is known a process which comprises the first step of polymerizing propylene or propylene containing a small amount of ethylene to form a propylene polymer or a propylene-ethylene copolymer and the second step of copolymerizing ethylene, or propylene containing a higher amount of ethylene than in the first step, with the first step polymer or copolymer.

In the above-mentioned process, however, usually the polymerization velocity in the second step is higher than in the first step and hence it is difficult to control the polymerization ratio in the second step. This tends to yield an increased amount of polymer of low stereospecificity or amorphous polymer in the second step. As a consequence, the quality of the product polymer is adversely affected. In particular, a gas-phase block polymerization process wherein the second step polymerization is conducted in the gas suffers from a number of disadvantages. There is a tendency for lumps of polymers to form in the polymerization vessel because polymer particles stick to one another. Similarly, the polymer tends to build-up on the interior surfaces of the polymerization vessel. Furthermore, the piping is apt to become fouled, and the polymer tends to stick to silos and hoppers. These disadvantages not only make it difficult to maintain normal operation but adversely affect the quality of products.

SUMMARY OF THE INVENTION

In this prior art context, an object of the present invention is to provide a process for producing an ethylene-propylene block copolymer in which a stable polymerization reaction can be maintained, and which produces ethylene-propylene block copolymers having an excellent appearance, elongation and impact resistance when molded.

This and other objectives will become apparent from the following description of the invention.

Thus, according to the present invention, there is provided a process for producing ethylene-propylene block copolymers which comprises (1) a first step of reacting propylene or a mixture of propylene and ethylene in the presence of a catalyst composed essentially of
   (A) a solid catalyst component containing magnesium, titanium and a halogen as the indispensable ingredients,
   (B) an organoaluminum compound, and
   (C) a silicon compound (1) represented by the formula $R^1R^2Si(OR^3)_2$, wherein $R^1$ is an alicyclic hydrocarbon group of 5–20 carbon atoms and $R^2$ and $R^3$ are each independently a hydrocarbon group of 1–20 carbon atoms, to form a propylene homopolymer portion or an ethylene-propylene copolymer portion having an ethylene content of 3% by weight or less, in an amount corresponding to 50–95% by weight of the total block copolymer amount, and
(2) a second step of reacting a mixture of ethylene and propylene with the polymer portion obtained in the first step in the presence of the aforesaid catalyst composed essentially of the components (a), (b) and (c) and in the additional presence of a silicon compound (2) represented by the formula $R^4{}_aSi(OR^5)_{4-a}$, wherein $R^4$ and $R^5$ are each independently a hydrocarbon group of 1–20 carbon atoms and a is a number satisfying the equation $0 \leq a < 4$, to obtain an ethylene-propylene block copolymer which contains an ethylene-propylene copolymer portion having an ethylene content of at least 20% by weight in an amount corresponding to 5–50% by weight of the total block copolymer amount.

DETAILED DESCRIPTION OF THE INVENTION

The first step of the present invention comprises reacting propylene or a mixture of propylene and ethylene in the presence of a catalyst composed essentially of (a) a solid catalyst component containing magnesium, titanium and a halogen as the indispensable ingredients, (b) an organoaluminum compound and (c) a silicon compound (1) represented by the formula $R^1R^2Si(OR^3)_2$, wherein $R^1$ is an alicyclic hydrocarbon group of 5–20 carbon atoms and $R^2$ and $R^3$ are each independently a hydrocarbon group of 1–20 carbon atoms, to form a propylene homopolymer portion or an ethylene-propylene copolymer portion having an ethylene content of 3% by weight or less, in an amount corresponding to 50–95% by weight of the total block copolymer amount.

The solid catalyst component (a) used in the catalyst is generally obtained by reducing a titanium compound with an organomagnesium compound, treating the resulting solid product with an ester compound, such as a phthalic ester, and then treating it with, for example, titanium tetrachloride.

The titanium compound used may be, for example, those represented by the formula $Ti(OR^6)_bX_{4-b}$, wherein $R^6$ is a hydrocarbon group of 1–20 carbon atoms, X is a halogen atom and b is a number satisfying the equation $0 < b \leq 4$.

Specific examples of $R^6$ include alkyl groups such as methyl, ethyl, propyl, isopropyl, butyl, isobutyl, amyl, isoamyl, hexyl, heptyl, octyl, decyl, dodecyl, etc.; aryl groups such as phenyl, cresyl, xylyl, naphthyl, etc.; cycloalkyl groups such as cyclohexyl, cyclopentyl, etc.; alkenyl groups such as propenyl, etc.; and aralkyl groups such as benzyl, etc.

The organomagnesium compound used may be any type of organomagnesium compound containing a magnesium-carbon bond. Particularly preferred are Grignard compounds represented by the formula $R^7MgX$, wherein $R^7$ is a hydrocarbon group of 1–20 carbon atoms and X is a halogen atom, and magnesium compounds represented by the formula $R^8R^9Mg$, wherein $R^8$ and $R^9$ are each independently a hydrocarbon group of 1–20 carbon atoms.

Specific examples of the Grignard compound include alkylmagnesium halides such as methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, etc.; and arylmagnesium halides such as phenylmagnesium bromide, etc. Specific examples of the magnesium compound include dialkylmagnesiums such as diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, etc.; diarylmagnesiums such as diphenylmagnesium, etc.; and arylalkylmagnesium such as phenylbutylmagnesium, etc.

The organoaluminum compounds (b) used in the catalyst are those which contain at least one aluminum-carbon bond in the molecule.

Specific examples of such organoaluminum compounds include trialkylaluminums such as triethylaluminum, triisobutylaluminum, trihexylaluminum, etc.; dialkylaluminum halides such as diethylaluminum halides, diisobutylaluminum halides, etc.; mixtures of trialkylaluminums and dialkylaluminum halides; and alkylalumoxanes such as tetraethyldialumoxane, tetrabutyldialumoxane, etc. Of these organoaluminum compounds, preferred are trialkylaluminums, mixtures of trialkylaluminums and dialkylaluminum halides, and alkylalumoxanes, and particularly preferred are triethylaluminum, triisobutylaluminum, a mixture of triethylaluminum and diethylaluminum chloride, and tetraethyldialumoxane.

The silicon compound (1) of the component (c) of the catalyst may be, for example, the silicon compound wherein $R^1$ is a cycloalkyl group of 5–20 carbon atoms and $R^2$ and $R^3$ are each an alkyl group of 1–20 carbon atoms. Specific examples thereof are shown below.

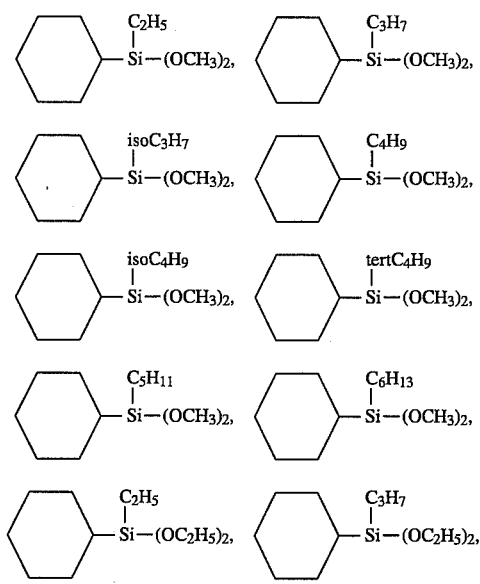

-continued

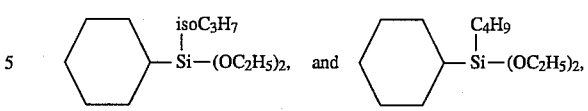

The catalyst components (a), (b) and (c) may be fed into the reaction system either each individually or after preliminarily mixing two or three components. Alternatively, for example three components may be mixed, propylene may be preliminarily polymerized in the presence of the mixture, and the resulting product may be fed into the reaction system. Further, these methods may also be used in combination.

The amount of the component (a) to be used is usually 0.005–0.5 mmol, preferably 0.01–0.3 mmol, in terms of titanium atom, per 1 l of polymerization volume. An amount of component (b) is used to provide a molar ratio of aluminum in the component (b) to titanium in the component (b) to titanium in the component (a) which is usually in the range of 1–1000, although the range is preferably 5–600. An amount of component (c) is used to provide a molar ratio of the component (c) to titanium in the component (a) which is usually in the range of 0.05–500, although the range is preferably 0.1–200.

In the first step, a highly stereospecific and highly crystalline propylene polymer portion or ethylene-propylene copolymer portion is produced by homopolymerization of propylene or copolymerization of propylene with 3% by weight or less, preferably 1.5% by weight or less, of ethylene. The polymerization or copolymerization of the first step should be conducted so as to give an amount of the polymer portion which corresponds to 50–95% by weight, preferably 60–90% by weight, of the total polymerization amount of the ethylene-propylene block copolymer ultimately obtained.

In the first step, the polymerization temperature is usually 20°–200° C., but is preferably 50°–90° C. The polymerization pressure is usually from atmospheric pressure to 100 kg/cm²G, but is preferably 2–50 kg/cm²G.

The reaction of the first step may also be conducted in two or more stages; in such a case, the polymerization conditions in respective stages may be different from one another. Further, according to necessity, hydrogen may be supplied to the reaction system to control the intrinsic viscosity [η] of the polymer formed.

The second step of the present invention comprises reacting a mixture of ethylene and propylene with the polymer portion obtained in the first step in the presence of the aforesaid catalyst composed essentially of the components (a), (b) and (c) and the presence of a silicon compound (2) represented by the formula $R^4_aSi(OR^5)_{4-a}$, wherein $R^4$ and $R^5$ are each independently a hydrocarbon group of 1–20 carbon atoms and a is a number satisfying the equation $0 \leq a < 4$, to obtain an ethylene-propylene block copolymer which contains an ethylene-propylene copolymer portion having an ethylene content of at least 20% by weight in an amount corresponding to 5–50% by weight of the total block copolymer amount. The polymer portion obtained in the first step usually contains the aforesaid catalyst composed essentially of the components (a), (b) and (c) used in the first step.

The silicon compound (2) represented by the formula $R^4_aSi(OR^5)_{4-a}$, wherein $R^4$ and $R^5$ are each independently a hydrocarbon group of 1–20 carbon atoms and a is a number satisfying the equation $0 \leq a < 4$, may be, for example, those wherein $R^4$ is a cycloalkyl group or an alkyl group and $R^5$ is a cycloalkyl group. Specific examples of such compounds are shown below.

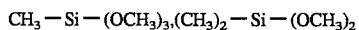
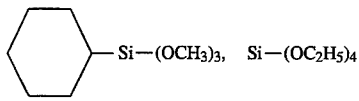
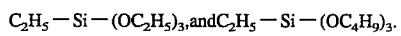

The silicon compound (2) is used in such an amount as to give a molar ratio of the silicon compound (2) to titanium in the component (a) which is usually in the range of 1–500, and is preferably in the range of 5–200.

In the second step, an ethylene-propylene block copolymer containing a highly stereospecific and highly crystalline copolymer portion is obtained by copolymerizing ethylene and propylene to form an ethylene-propylene copolymer portion having an ethylene content of at least 20% by weight. The copolymerization should be conducted such that the ethylene-propylene copolymer portion is formed in an amount of 5–50% by weight, preferably 10–40% by weight, of the total polymerization amount of the ethylene-propylene block copolymer.

In the second step, the polymerization temperature is usually 20°–200° C., and is preferably 50°–90° C., and the polymerization pressure is usually from atmospheric pressure to 100 kg/cm²G, and is preferably 2–50 kg/cm²G.

The reaction of the second step may also be conducted in two or more stages as in the first step. In such a case, the polymerization conditions in respective stages may be different from one another. The ethylene-propylene copolymer formed in the second step can be controlled by using hydrogen so as to have an intrinsic viscosity [η] (determined in decalin at 135° C.) which is usually 0.5–8.0, preferably 0.5–6.0, and more preferably 1.0–4.0.

The present invention can be applied to various processes, for example, gas-phase polymerization, slurry polymerization, etc. When a slurry polymerization is adopted, it can be conducted by using an inert hydrocarbon solvent such as hexane, heptane, etc.

DESCRIPTION OF THE PREFERRED EMBODIMENTS

The present invention is described in more detail below with reference to Examples and Comparative Examples, but the Examples should not be construed as limiting the scope of the present invention.

The properties of polymer shown in Examples were determined in the following manner.

(1) MI

This was determined in accordance with the method specified in JIS K 6758, at a measuring temperature of 230° C. and a load of 2.16 kg/cm².

(2) FE (fish eye)

A 100 cm² piece was cut out from a T-die extrusion film of 30 μm thickness, and the number of fish eyes having a diameter of 200 μm or more was determined by using a peak scale of 10 magnifications.

Polymers with a small number of fish eyes give a good appearance in molding.

(3) Tensile property

In accordance with the method specified in ASTM D 638, tensile yield strength and tensile elongation were determined with a test piece of 3.2 mm thickness at a measuring temperature of 23° C.

(4) Flexural property

In accordance with the method specified in JIS K 7203, flexural modulus of elasticity was determined with a test piece of 3.2 mm thickness under conditions of a span length of 50 mm, loading velocity of 1.5 mm/min and measuring temperature of 23° C.

(5) Izod impact strength

In accordance with the method specified in JIS K 7110, impact strength with knotch was determined with a test piece of 3.2 mm thickness at measuring temperatures of 23° C. and −20° C.

(6) Falling weight impact strength

Resin was injection-molded into a sheet of 1 mm thickness, and a disk having a diameter of 66 mm was punched out from the sheet and used as a test piece. The test piece was conditioned at 23° C. and 50% RH for at least 40 hours, then kept at the measuring temperature (0° C. or −20° C.) for at least 2 hours, and thereafter the fracture strength was determined with a dupont impact tester using weights of 0.10–3 kg.

(7) Ethylene content

Ethylene content was determined from the infrared absorption spectrum.

REFERENTIAL EXAMPLE (A) Synthesis of organomagnesium compound

A 1-l flask fitted with a stirrer, reflux condenser, dropping funnel and thermometer was flushed with argon gas, and 32.0 g of magnesium turnings for Grignard reagent were placed in the flask. Into the dropping funnel were charged 120 g of butyl chloride and 500 ml of dibutyl ether, and about 30 ml of the resulting mixture was added dropwise onto the magnesium in the flask to initiate the reaction. After initiation of the reaction, the dropwise addition was continued at 50° C. over a period of 4 hours. After completion of the addition, the reaction was continued at 60° C. for additional 1 hour. Thereafter the reaction liquid was cooled to room temperature and then filtered to remove solid materials.

The concentration of butylmagnesium chloride in dibutyl ether was determined by hydrolyzing the filtrate with 1-N sulfuric acid, followed by back titration with a 1-N aqueous sodium hydroxide solution using phenolphthalein as an indicator. The concentration was found to be 2.1 mol/l.

(B) Synthesis of solid product

A 500-ml flask fitted with a stirrer and a dropping funnel was flushed with argon gas, and 240 ml of hexane, 5.4 g (15.8 mmols) of tetrabutoxytitanium and 61.4 g (295 mmols) of tetraethoxysilane were charged thereinto to form a uniform solution. Then, 150 ml of the organomagnesium compound synthesized in (A) above was gradually added dropwise from the dropping funnel over a period of 4 hours while keeping the temperature in the flask at 5° C. After completion of the dropwise addition, the reaction mixture was stirred for further 1 hour at room temperature and then separated at room temperature into solid and liquid. The solid was washed 3 times with 240 ml of hexane, and then dried to obtain 45.0 g of a brown solid product.

The solid product contained 1.7% by weight of titanium atoms, 33.8% by weight of ethoxy groups and 2.9% by weight of butoxy groups.

The wide angle X-ray diffraction pattern of the solid product obtained by using Cu-Kα line showed utterly no distinct diffraction peak, revealing that the product was of an amorphous structure.

(C) Synthesis of ester-treated solid

A 100-ml flask was flushed with argon gas, then 6.5 g of the solid product synthesized in (B) above, 16.2 ml of toluene and 4.3 ml (16 mmols) of diisobutyl phthalate were placed therein and the mixture was allowed to react at 95° C. for 1 hour.

After completion of the reaction, the reaction mixture was separated a solid and a liquid phase, and the solid was washed 3 times with 33 ml of toluene.

(D) Synthesis of solid catalyst component

After completion of the washing in (C) above, 16.2 ml of toluene, 0.36 ml (1.3 mmols) of diisobutyl phthalate, 2.2 ml (13 mmols) of butyl ether and 38.0 ml (346 mmols) of titanium tetrachloride were added to the washed product in the flask and reacted at 95° C. for 3 hours. After completion of the reaction the reaction mixture was separated to a solid and a liquid phase at 95° C., and the solid was washed twice with 33 ml of toluene at the same temperature. The aforesaid treatment with a mixture of diisobutyl phthalate, butyl ether and titanium tetrachloride was repeated once more under the same conditions, and the solid thus treated was washed 3 times with 33 ml of hexane to obtain 5.0 g of an ocherous solid catalyst component.

The solid catalyst component contained 2.1% by weight of titanium atoms, 19.9% by weight of magnesium atoms and 12.7% by weight of the phthalic acid ester.

EXAMPLE 1

(A) Preliminary mixing of catalyst and preliminary polymerization

A 250-l reactor fitted with a stirrer was charged with 150 l of a thoroughly purified hexane, then the atmosphere in the system was replaced thoroughly with nitrogen, and 3.2 mols of triethylaluminum (hereinafter abbreviated as TEA), 0.32 mols of cyclohexylethyldimethoxysilane (hereinafter abbreviated as CHEDMS) and 51.8 g, in terms of Ti atoms, of the solid catalyst component obtained in (D) of the Referential Example were added to the system. Then, 5.6 kg of propylene was continuously added over a period of 2 hours while keeping the temperature at 25° C.

(B) Polymerization

An apparatus comprising three gas phase polymerization vessels connected in series was used. The three vessels (each having a volume of 1000 l) are respectively referred to as the vessels X, Y and Z. Homopolymerization of propylene was conducted in the vessels X and Y. In the polymerization, the pressure was 21 kg/cm$^2$ in the vessel X and 17 kg/cm$^2$G in the vessel Y, and the temperature was 75° C. in both the vessel X and the vessel Y. The catalyst prepared in (A) above was diluted with hexane and fed continuously into the vessel X at a rate of 23 mg/hour in terms of Ti so that the total average residence time in the vessels X and Y might be 4 hours. Concurrently, 50 mmols/hour of TEA and 5 mmols/hour of CHEDMS were fed into the vessel X and further, hydrogen was fed continuously so as to give a hydrogen concentration in vessels X and Y of 1.2%.

The polymer discharged from the vessel Y was transferred to the vessel Z, wherein propylene and ethylene were polymerized at a pressure of 12 kg/cm$^2$G, a temperature of 70° C. and a residence time of 1 hour. Ethylene, propylene and hydrogen were supplied so as to give an ethylene concentration of 27% and a hydrogen concentration of 0.7%. Further, tetraethoxysilane (hereinafter abbreviated as TES) was continuously supplied so as to give a molar ratio of TES to titanium in the catalyst component of 45.

The ethylene-propylene block copolymer thus obtained had a MI of 8.9 and showed a catalyst activity of 40,000 g PP/mmol Ti. The polymerization amount in the vessel Z (hereinafter referred to as EP content) was 15% by weight relative to the total amount of the ethylene-propylene block copolymer obtained. The polymerization progressed in a stable manner. The composition and the property of the polymer obtained are shown in Table 1, which reveals that an ethylene-propylene block copolymer excellent in appearance, elongation and falling weight impact strength could be obtained.

COMPARATIVE EXAMPLE 1

Polymerization was conducted in the same manner as in Example 1 except that no TES was supplied to the vessel Z. The ethylene-propylene block copolymer obtained had a MI of 7.3 and showed a catalyst activity of 42,000 g PP mmol Ti. The EP content was 15.0% by weight relative to the total amount of the ethylene-propylene block copolymer. The composition and the property of the polymer obtained are shown in Table 1. The polymer shows inferior elongation, appearance and falling weight impact strength.

TABLE 1

|  | Example 1 | Comp. Example 1 |
|---|---|---|
| MI (g/10 min) | 9.2 | 7.3 |
| EP content (wt %) | 15.0 | 15.0 |
| Ethylene content (wt %)[1] | 38.0 | 38.0 |
| Tensile property |  |  |
| Yield stress (kg/cm$^2$) | 279 | 270 |
| Elongation at break (%) | 290 | 150 |
| Flexural property Modulus of elasticity (kg/cm$^2$) | 13600 | 14600 |
| Izod impact strength |  |  |
| 23° C. (kg/cm cm) | 9.2 | 7.4 |
| −20° C. (kg/cm cm) | 4.6 | 4.1 |
| FE (member/100 cm$^2$) | 20 | 152 |

Note: [1] Ethylene content of ethylene-propylene copolymer portion

What is claimed is:

1. A process for producing ethylene-propylene block copolymers which comprises:

(1) a first step of reacting propylene or a mixture of propylene and ethylene in the presence of a catalyst consisting essentially of (A) a solid catalyst component having magnesium, titanium and a halogen obtained from a titanium compound represented by the formula Ti(OR$^6$)b$^X{}_{4-b}$ is wherein R$^6$ is a hydrocarbon group having 1–20 carbon atoms, X is a halogen atom and b is a number satisfying the equation 0<b≦4, an organo-magnesium compound represented either by the formula R$^7$MgX, wherein R$^7$ is a hydrocarbon group having a 1–20 carbon atoms and X is a halogen atom, or the formula R$^8$R$^9$Mg, wherein R$^8$ and R$^9$ are each independently a hydrocarbon group having 1– 20 at carbon atoms, and titanium tetrachloride, (B) an organoaluminum compound, and (C) a silicon compound (1) represented by the formula R$^1$R$^2$Si(OR$^3$)$_2$, wherein R$^1$ is an alicyclic hydrocarbon group having 5–20 carbon atoms and R$^2$ independent of R$^3$ is a 1–20 carbon alkyl group and R$^3$ independent of R$^2$ is a hydrocarbon group having 1–20 carbon atoms, to form a propylene homopolymer portion or an ethylene-propylene copolymer portion having an ethylene content of 3% by weight or less, in an amount corresponding to 60–90% by weight of the total block copolymer amount; and (2) a second step of reacting a mixture of ethylene and propylene with the polymer portion obtained in the first step in the presence of the aforesaid catalyst consisting essentially of the components (A), (B) and (C) and in the additional presence of a silicon compound (2) represented by the formula $R^4{}_a Si(OR^5)_{4-a}$, wherein $R^4$ is an alkyl group having 1–20 carbon atoms or a cycloalkyl group having up to 20 carbon atoms and $R^5$ is a cycloalkyl having up to 20 carbon atoms or alkyl group having 1–20 carbon atoms, and a is a number satisfying the equation $0 \leq a < 4$, to obtain an ethylene-propylene block copolymer which contains an ethylene-propylene copolymer portion having an ethylene content of at least 20% by weight, in an amount corresponding to 10–40% by weight of the total block copolymer amount.

2. The process according to claim 1 wherein the organoaluminum compound is selected from the group consisting of trialkylaluminums, dialkylaluminum halides, mixtures of trialkylaluminums and dialkylaluminum halides, and alkylalumoxanes.

3. The process according to claim 1 wherein, in the first step, the reactant is propylene and the polymer portion obtained is a propylene homopolymer portion.

4. The process according to claim 1 wherein, in the silicon compound (1), $R^1$ is a cycloalkyl group and $R^2$ and $R^3$ are each independently an alkyl group.

5. The process according to claim 1, in the silicon compound (2) $R^5$ is an alkyl group.

6. The process according to claim 1, wherein $R_4$ is cyclohexyl.

7. The process according to claim 1, wherein said silicon compound (2) is selected from the group consisting of methyl trimethoxysilane, dimethyl dimethoxysilane, cyclohexyl trimethoxy silane, tetraethoxysilane, ethyl triethoxysilane, and ethyl tributoxysilane.

8. The process according to claim 7, wherein said silicon compound (2) is tetraethoxysilane.

9. The process according to claim 1, wherein in said silicon compound (2) a is 2.

10. The process according to claim 1, wherein $R^5$ is alkyl.

11. The process according to claim 1, wherein $R^5$ is cycloalkyl.

12. A process for producing ethylene-propylene block copolymers which comprises:

(1) a first step of reacting propylene or a mixture of propylene and ethylene in the presence of a catalyst which consists essentially of (A) a solid catalyst component consisting essentially of magnesium, titanium and a halogen, (B) an organoaluminum compound, and (C) a silicon compound (1) represented by the formula $R^1 R^2 Si(OR^3)_2$, wherein $R^1$ is an alicyclic hydrocarbon group of 5–20 carbon atoms and $R^2$ independent of $R^3$ is a 1–20 carbon alkyl group and $R^3$ independent of $R^2$ is a hydrocarbon group of 1–20 carbon atoms, to form a propylene homopolymer portion or an ethylene-propylene copolymer portion having an ethylene content of 3% by weight or less, in an amount corresponding to 50–95% by weight of the total block copolymer amount; and (2) a second step of reacting a mixture of ethylene and propylene with the polymer portion obtained in the first step in the presence of a catalyst consisting essentially of the aforesaid components (A), (B) and (C) and a silicon compound (2) represented by the formula $R^4{}_a Si(OR^5)_{4-a}$, wherein $R^4$ is a cycloalkyl group having up to 20 carbon atoms or an alkyl group having 1–20 carbon atoms and $R^5$ is a cycloalkyl group having up to 20 carbon atoms or an alkyl group of 1–20 carbon atoms, and a is a number satisfying the equation $0 \leq a < 4$, to obtain an ethylene-propylene block copolymer having an ethylene-propylene copolymer portion having an ethylene content of at least 20% by weight, in an amount corresponding to 5–50% by weight of the total block copolymer amount.

13. The process according to claim 12, wherein in the first step the propylene homopolymer portion or the ethylene-propylene copolymer portion which is present in the block copolymer corresponds to 60–90% by weight of the total of the block copolymer amount, and in second step the amount of the ethylene-propylene copolymer portion corresponds to 10–40% by weight of the total of the block copolymer amount.

14. The process according to claim 12, wherein $R^4$ is cyclohexyl.

15. The process according to claim 12, wherein said silicon compound (2) is selected from the group consisting of methyl trimethoxysilane, dimethyl dimethoxysilane, cyclohexyl trimethoxy silane, tetraethoxysilane, ethyl triethoxysilane, and ethyl tributoxysilane.

16. The process according to claim 15, wherein said silicon compound (2) is tetraethoxysilane.

17. The process according to claim 12, wherein in said silicon compound (2) a is 2.

18. The process according to claim 12, wherein $R^5$ is alkyl.

19. The process according to claim 12, wherein $R^5$ is cycloalkyl.

20. The process according to claim 12, in the silicon compound (2) $R^5$ is an alkyl group.

* * * * *